(12) United States Patent
Siebeneick

(10) Patent No.: US 9,752,614 B2
(45) Date of Patent: Sep. 5, 2017

(54) WHEEL SUSPENSION BEARING, WHEEL SUSPENSION BEARING ASSEMBLY AND MOTOR VEHICLE

(71) Applicant: GM GLOBAL TECHNOLOGY OPERATIONS LLC, Detroit, MI (US)

(72) Inventor: Juergen Siebeneick, Oberwesel (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 14/610,939

(22) Filed: Jan. 30, 2015

(65) Prior Publication Data
US 2015/0219146 A1 Aug. 6, 2015

(30) Foreign Application Priority Data
Jan. 31, 2014 (DE) .......................... 10 2014 001307

(51) Int. Cl.
| | |
|---|---|
| *F16C 17/02* | (2006.01) |
| *B60G 7/00* | (2006.01) |
| *F16C 35/02* | (2006.01) |
| *B60G 7/02* | (2006.01) |
| *B60G 21/05* | (2006.01) |
| *F16F 1/38* | (2006.01) |
| *F16C 27/06* | (2006.01) |

(52) U.S. Cl.
CPC .............. *F16C 17/02* (2013.01); *B60G 7/001* (2013.01); *B60G 7/02* (2013.01); *B60G 21/051* (2013.01); *B60G 21/052* (2013.01); *F16C 35/02* (2013.01); *F16F 1/38* (2013.01); *B60G 2200/20* (2013.01); *B60G 2204/41* (2013.01); *F16C 27/063* (2013.01); *F16C 2326/05* (2013.01)

(58) Field of Classification Search
CPC ........... F16C 17/02; F16C 35/02; B60G 7/001
See application file for complete search history.

(56) References Cited

U.S. PATENT DOCUMENTS

| | | | | |
|---|---|---|---|---|
| 1,668,295 | A | | 5/1928 | Weinhardt |
| 2,202,615 | A | * | 5/1940 | Barenyi .................. A23C 3/076 267/257 |
| 3,273,910 | A | * | 9/1966 | Willingshofer .......... B60G 7/02 280/86.756 |
| 3,868,129 | A | * | 2/1975 | Grosseau ............... B60G 7/001 267/279 |
| 4,486,030 | A | | 12/1984 | Takata et al. |

(Continued)

FOREIGN PATENT DOCUMENTS

| | | |
|---|---|---|
| DE | 7306019 U | 2/1975 |
| DE | 3703868 A1 * | 8/1988 ............... B60G 7/02 |

(Continued)

OTHER PUBLICATIONS

DPMA, German Search Report for Country Application No. 102014001307.3, dated Dec. 18, 2014.

*Primary Examiner* — Faye M Fleming
(74) *Attorney, Agent, or Firm* — Lorenz & Kopf LLP

(57) ABSTRACT

A wheel suspension bearing is disclosed as being arranged on a member of a motor vehicle, with a bearing bushing and a bearing bushing carrier. The bearing bushing carrier incorporates the bearing bushing and is designed to be situated in the member of the motor vehicle. A wheel suspension bearing assembly, as well as a correspondingly equipped motor vehicle is also disclosed.

13 Claims, 2 Drawing Sheets

(56) References Cited

U.S. PATENT DOCUMENTS 5,403,030 A * 4/1995 Chun .................. B60G 21/052
　　　　　　　　　　　　　　　　280/124.128
6,086,076 A　　7/2000 Prem et al.

FOREIGN PATENT DOCUMENTS

| DE | 4021928 A1 | 1/1992 | | |
|---|---|---|---|---|
| DE | 19952325 A1 | 5/2005 | | |
| DE | 212011100114 U1 | 2/2013 | | |
| GB | 2442716 A | 4/2008 | | |
| JP | 06305314 A | * | 11/1994 | ............... B60G 9/04 |
| JP | 10309916 A | * | 11/1998 | ............... B60G 7/00 |
| WO | 9736120 A1 | 10/1997 | | |

* cited by examiner

WHEEL SUSPENSION BEARING, WHEEL SUSPENSION BEARING ASSEMBLY AND MOTOR VEHICLE

CROSS REFERENCE TO RELATED APPLICATION

This application claims priority to German Patent Application No. 102014001307.3 filed Jan. 31, 2014, which is incorporated herein by reference in its entirety.

TECHNICAL FIELD

A wheel suspension bearing, wheel suspension assembly and motor vehicle are described.

BACKGROUND

Wheel suspension bearings of the kind mentioned at the outset are known. The known wheel suspension bearings are usually fixed in place in retainers, retaining flanges or the like on a member of the motor vehicle. Providing such retaining structures takes up installation space, and additionally requires the use of more material for molding the flange, retainers or the like. DE 696 24 802 T2 discloses a suspension for heavy dump trucks, in which the rear wheel suspension exhibits swivel bearings secured to cross members of a frame.

SUMMARY

In accordance with the present disclosure, a wheel suspension bearing, a wheel suspension bearing assembly, and a motor vehicle of the kind mentioned at the outset is disclosed, which reduces the space required for the wheel suspension and lowers the weight of the wheel suspension bearing.

The wheel suspension bearing described here is provided for arrangement on a member of a motor vehicle. For example, such a member can be a longitudinal member or a cross member. Such members are used in the motor vehicle to support the vehicle structure and absorb driving forces. As a result, arranging a wheel suspension bearing on such a member allows the force to be distributed directly from the body to the wheel.

The wheel suspension bearing exhibits a bearing bushing and a bearing bushing carrier, in which the bearing bushing is situated. The bearing bushing carrier is designed to be arranged in the member of the motor vehicle. For example, the bearing bushing of the wheel suspension bearing can contain a rubber bearing, e.g., to compensate for any driving forces that arise and attenuate noise.

Arranging the bearing bushing carrier in the motor vehicle member eliminates the need for using retainers, flanges or the like that had previously been employed. Instead, the wheel suspension bearing can be mounted directly in the motor vehicle member, thereby saving on installation space and material used. A corresponding wheel suspension bearing thus requires less space and is easier to realize than known wheel suspension bearings. Using less material also makes it less expensive to manufacture a corresponding wheel suspension bearing.

In an additional aspect of the wheel suspension bearing, the bearing bushing carrier can exhibit at least one clamping flange for abutment against the motor vehicle member. The clamping flange makes it possible to position the wheel suspension bearing relative to the motor vehicle member and secure it thereto.

In another possible aspect, the clamping flange of the wheel suspension bearing can exhibit at least one through hole, by means of which the clamping flange can be joined with the member. The through hole can be used to join the clamping flange on the motor vehicle member with the motor vehicle member with screws, rivets or the like. The use of fasteners such as a threaded fastener for attachment purposes offers one attachment solution and enables maintenance of the wheel suspension bearing, for example by changing out defective components.

In addition, the bearing bushing carrier can exhibit a second clamping flange for arrangement on the side of the motor vehicle member lying opposite the first clamping flange. In this way, the wheel suspension bearing can be secured to the motor vehicle member from both sides. The second clamping flange can be designed in two pieces with the first clamping flange, so as to allow assembly to the motor vehicle member from one side.

In another aspect the present disclosure relates to a wheel suspension bearing assembly with at least one wheel suspension bearing constructed as described above. The wheel suspension bearing assembly further exhibits a carrier having a through recess for accommodating the wheel suspension bearing. This makes it possible to mount the wheel suspension bearing directly in a motor vehicle member, so as to save on space and materials.

The member can be a longitudinal member or cross member of the motor vehicle. Other motor vehicle members can also be suitable for accommodating a corresponding wheel suspension. A longitudinal member is often used in rear wheel suspensions. The wheel suspension bearing is here frequently arranged in such a way that a swiveling axis of a wheel suspension arm is essentially horizontally situated. In corresponding wheel suspensions, including at the front of a motor vehicle, a corresponding axis can also be essentially vertically situated, for example to enable a steering motion of a wheel hung on the wheel suspension.

Another aspect of the wheel suspension bearing assembly can provide that the through recess of the member incorporate a bushing for accommodating the bearing. Such a bushing can be used to stabilize and also seal the member. In addition, a corresponding bushing can be precisely manufactured, and easily incorporated into the member. As a result, the bushing makes it possible to precisely position the wheel suspension bearing in the member. The bushing can be fixed in place in the member, for example through welding or adhesive bonding.

Another aspect of the wheel suspension bearing assembly relates to at least one hole in the member for fixing in place the wheel suspension bearing. The hole can be used to screw, rivet, or otherwise attach the wheel suspension bearing to the member.

Another embodiment of the wheel suspension bearing assembly with hole provides that the hole be configured as a through hole. The wheel suspension bearing is fixed in place by means of at least one bolt extending through the member. This yields an especially stable attachment of the wheel suspension bearing, since the latter can be attached from both sides of the member, which is oriented toward all arising forces that can act on the wheel suspension bearing assembly.

In addition, an embodiment can provide that the bolt be a rivet bolt or threaded bolt with male and/or female thread. A rivet bolt can be captively mounted, wherein a threaded bolt with male and/or female thread simplifies maintenance of a wheel suspension bearing assembly.

Furthermore, the through recess of the wheel suspension bearing assembly can have a larger clearance than a portion of the clamping flange(s) projecting into the through recess. The clamping flange can then be fixed in place with the holes and used fixing means, such as bolts. This provides a displacement path for the clamping flange in the through recess, and hence makes it possible to adjust the wheel suspension bearing assembly, e.g., for purposes of wheel alignment.

As an alternative to fixation via an attachment, such as bolts, screws or rivets, the bushing in the member can establish an interference fit with the wheel suspension bearing. In this way, the wheel suspension bearing can be pressed into the bushing of the member and held by the interference fit. Such an arrangement is stable on the one hand, and prevents the wheel suspension bearing from detaching on the other, which could alter drivability and cause noise.

In another embodiment of the wheel suspension bearing assembly, a motor vehicle suspension arm can be situated on the wheel suspension bearing. The motor vehicle suspension arm can guide a wheel hub, and can interact with chassis components, such as springs or shock absorbers.

The suspension arm can exhibit a trailing arm or wishbone. The trailing arm can be part of a compound crank rear axle. In particular, arranging trailing arms in the area of a rear axle is often critical as regards installation space, so that the described arrangement makes it possible to economize on installation space. The installation space can be made available for other motor vehicle functions, and for example increase a usable trunk width or the like. In one aspect, the member can be a longitudinal member. Configuring the wheel suspension arm assembly in this way makes it possible to place the trailing arm, especially far to the outside in the motor vehicle, so that the longitudinal member can be located further outside than in conventional arrangements, which facilitates the torsional rigidity of a corresponding motor vehicle.

The present disclosure further relates to a motor vehicle with at least one wheel suspension bearing assembly of the kind described above.

Additional features and details may be gleaned from the following description, which describes at least one exemplary embodiment in detail, if necessary with reference to the drawing. Described and/or graphically depicted features include the subject matter whether taken separately or in any sensible combination, possibly even independently of the claims, and can in particular also be the subject matter of one or more separate application(s). The same, similar and/or functionally identical parts are labeled with the same reference number.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
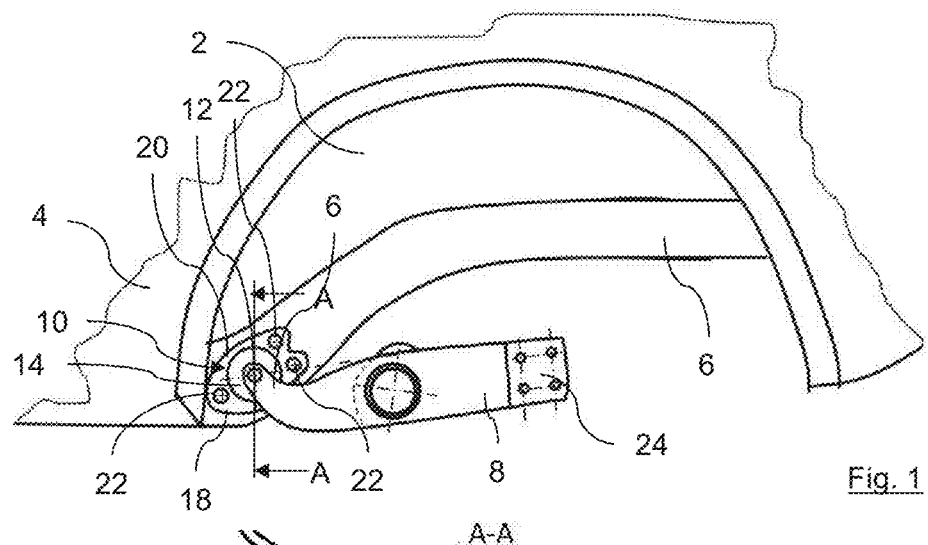
FIG. 1 is a side view depicting a cutout of a motor vehicle with a rear wheel well.

FIG. 1 shows a side view of a wheel well 2 of a motor vehicle 4. The wheel well 2 of the motor vehicle 4 is depicted without the wheel mounted. A longitudinal member 6 runs in the wheel well 2. The longitudinal member 6 is designed as a hollow profile, and exhibits an essentially rectangular cross section. More complex cross sections for the longitudinal member 6 are also conceivable.

A trailing arm 8 is arranged on the longitudinal member 6. The trailing arm 8 is part of a compound crank rear axle. The trailing arm 8 is secured to the longitudinal member 6 by means of a wheel suspension bearing 10. The rear axle bearing 10 exhibits a bearing journal 12, which is guided through an elastomer bearing body 14. The trailing arm 8 is fixed in place on the bearing journal 12 with a trailing arm flange 16. For example, the elastomer body 14 can be made out of rubber or polyurethane. A bushing can be provided in the elastomer for passing through the bearing journal 12. This bushing is not visible on FIG. 1, since it is covered by the bearing journal.

The wheel suspension bearing 10 is integrated into the longitudinal member 6. As depicted on the figures below, the longitudinal member 6 is thus open in the area of the wheel suspension bearing 10, so that it can accommodate the wheel suspension bearing 10. In the exemplary embodiment shown, the wheel suspension bearing 10 exhibits a bearing bushing carrier 18 with a clamping flange 20.

The clamping flange 20 is provided with three through holes, which are secured to the longitudinal member 6 by fastening screws 22. The fastening screws 22 can be configured as through screws or be screwed into the longitudinal member 6. Bolts can also be used instead of screws. As an alternative thereto, rivets can also be used to fix the clamping flange 20 in place on the longitudinal member 6.

The trailing arm 8 exhibits a connecting area 24 opposite the trailing arm flange 16 for situating the brake body and wheel.

Figure 2:
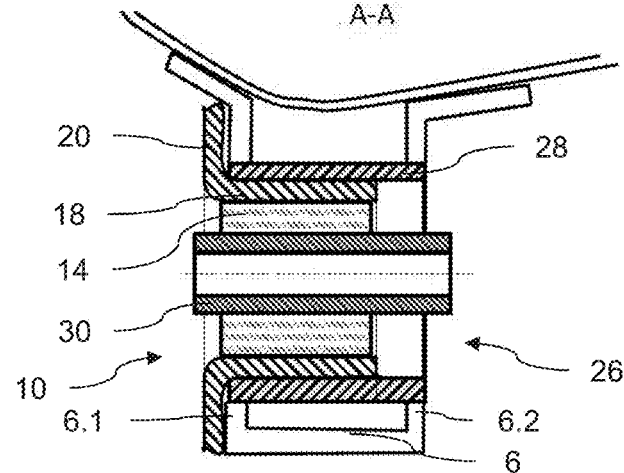
FIG. 2 is a cross section along cutting line A-A shown in FIG. 1 through a wheel suspension bearing assembly according to a first embodiment.

FIG. 2 shows a cross section along the cutting line A-A on FIG. 1. The longitudinal member 6 of the motor vehicle is designed as a hollow profile open at the top. Situated in the area of the wheel suspension bearing 10 is a through hole 26, into which a bushing 28 is inserted. The bushing 28 is used to seal the through hole 26 on the one hand, and to reinforce the longitudinal member 6 in the area of the through hole on the other.

The bearing bushing carrier 18 is introduced into the bushing 28. The wheel suspension bearing 10 is integrated into the bearing bushing carrier 18. The elastomer body 14 is fixed in place directly in the bearing bushing carrier 18 through vulcanization. The bearing bushing carrier 18 is also designed as a single piece with the clamping flange 20, which abuts against an outer wall 6.1 of the longitudinal member 6. The elastomer body 14 incorporates a sleeve 30 that accommodates the bearing journal 12 (not shown). The sleeve 30 protrudes over the clamping flange 20 and an inner wall 6.2 of the longitudinal member 6 in the transverse direction of the vehicle.

Figure 3:
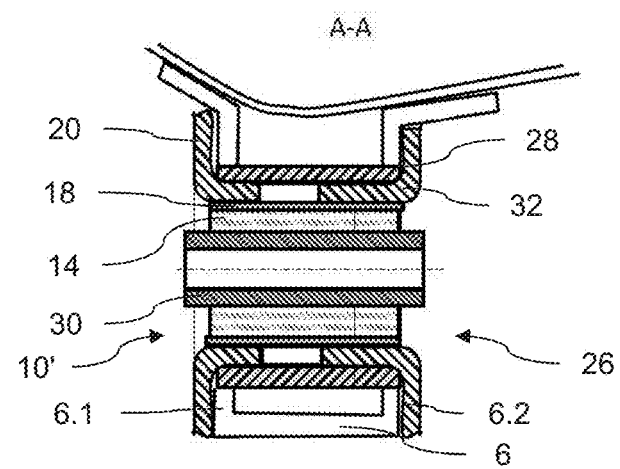
FIG. 3 is a cross section along cutting line A-A similar to that shown in FIG. 1 through a wheel suspension bearing assembly according to a second embodiment.

FIG. 3 presents a cross section through a second embodiment of a wheel suspension bearing 10'. Since the depiction is no different from the one on FIG. 1 viewed from the outside, a side view will not be separately shown. As opposed to the first embodiment, the wheel suspension bearing 10' exhibits a second clamping flange 32, which abuts against the inner wall 6.2. The clamping flange 32 can be inserted from inside.

In configurations where the outer clamping flange 20 is provided with through holes, the clamping flange 32 can be provided with corresponding through holes so that fastening screws or fastening bolts can be arranged through both clamping flanges 20, 32. A better support is achieved with the clamping flange 32. Alternatively, the fastening screws 22 (not shown on FIG. 3) may only be screwed into the longitudinal member 6 and not designed as through screws.

Figure 4A:
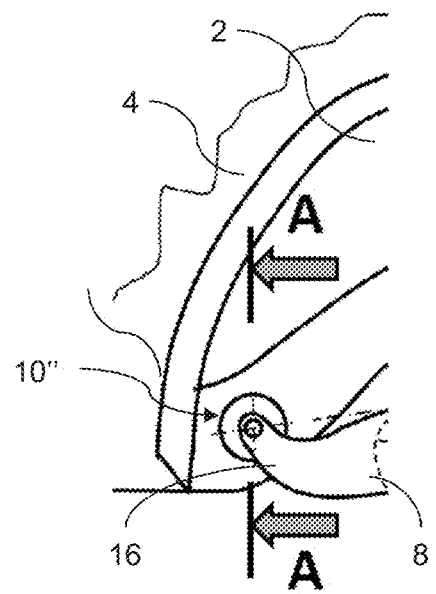
FIG. 4a is a side view depicting part of a motor vehicle wheel well with a wheel suspension bearing assembly according to a third embodiment.
Figure 4B:
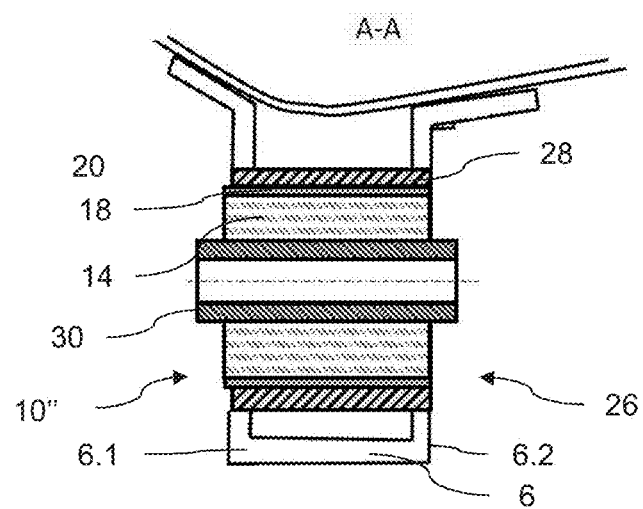
FIG. 4b is a cross section along cutting line A-A shown in FIG. 4a through a wheel suspension bearing assembly according to a third embodiment.

FIG. 4a shows a section of a wheel well 2 of a motor vehicle 4 with a third embodiment of a wheel suspension bearing 10". As opposed to the first and second embodiment, the wheel suspension bearing 10" has no clamping flange. The wheel suspension bearing 10" is instead pressed into the bushing 28, as evident from the section along the cutting line A-A on FIG. 4b. The outside of the bearing bushing carrier 18 along with the inside of the bushing 28 create an interference fit. The interference fit holds the wheel suspension bearing 10" in the longitudinal member 6.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A wheel suspension bearing comprising a bearing bushing and a bearing bushing carrier which incorporates the bearing bushing, wherein the bearing bushing carrier is configured to be situated in one of a longitudinal or cross member of a motor vehicle, wherein the bearing bushing carrier comprises at least one clamping flange configured to abut against the member of the motor vehicle.

2. The wheel suspension bearing according to claim 1, wherein the at least one clamping flange comprises at least one through hole, by means of which the clamping flange can be joined with the member.

3. The wheel suspension bearing according to claim 2, wherein the bearing bushing carrier comprises a first clamping flange and a second clamping flange configured to be arranged on a side of the member opposite the first clamping flange.

4. A wheel suspension assembly comprising:
a wheel suspension bearing including a bearing bushing and a bearing bushing carrier which incorporates the bearing bushing; and
a longitudinal or cross member having a through hole formed therein, wherein the bearing bushing carrier is situated in the through hole and accommodates the wheel suspension bearing, wherein the through hole has a larger clearance than a portion of at least one clamping flange projecting into the through hole.

5. The wheel suspension assembly according to claim 4, wherein the through hole incorporates a bushing accommodating the wheel suspension bearing.

6. The wheel suspension assembly according to claim 5, wherein the bushing in the member establishes an interference fit with the wheel suspension bearing.

7. The wheel suspension assembly according to claim 4, wherein the member is provided with at least one hole for fixing the wheel suspension bearing in place.

8. The wheel suspension assembly according to claim 6, wherein the at least one hole comprises a through hole, and wherein the wheel suspension bearing is fixed in place by at least one fastener extending through the member.

9. The wheel suspension assembly according to claim 8, wherein the fastener comprises at least one of a rivet bolt, a threaded bolt with male threads or a threaded bolt with female threads.

10. The wheel suspension assembly according to claim 4 further comprising, with a motor vehicle suspension arm mounted on the wheel suspension bearing.

11. The wheel suspension assembly according to claim 10, wherein the wheel suspension arm is selected from the group consisting of a trailing arm and a wishbone.

12. The wheel suspension assembly according to claim 4, wherein the member is a longitudinal member.

13. A motor vehicle with at least one wheel suspension assembly according to claim 4.

* * * * *